Nov. 9, 1926.
W. E. WOODARD
TENDER
Filed Jan. 8, 1925
1,606,284
2 Sheets-Sheet 1
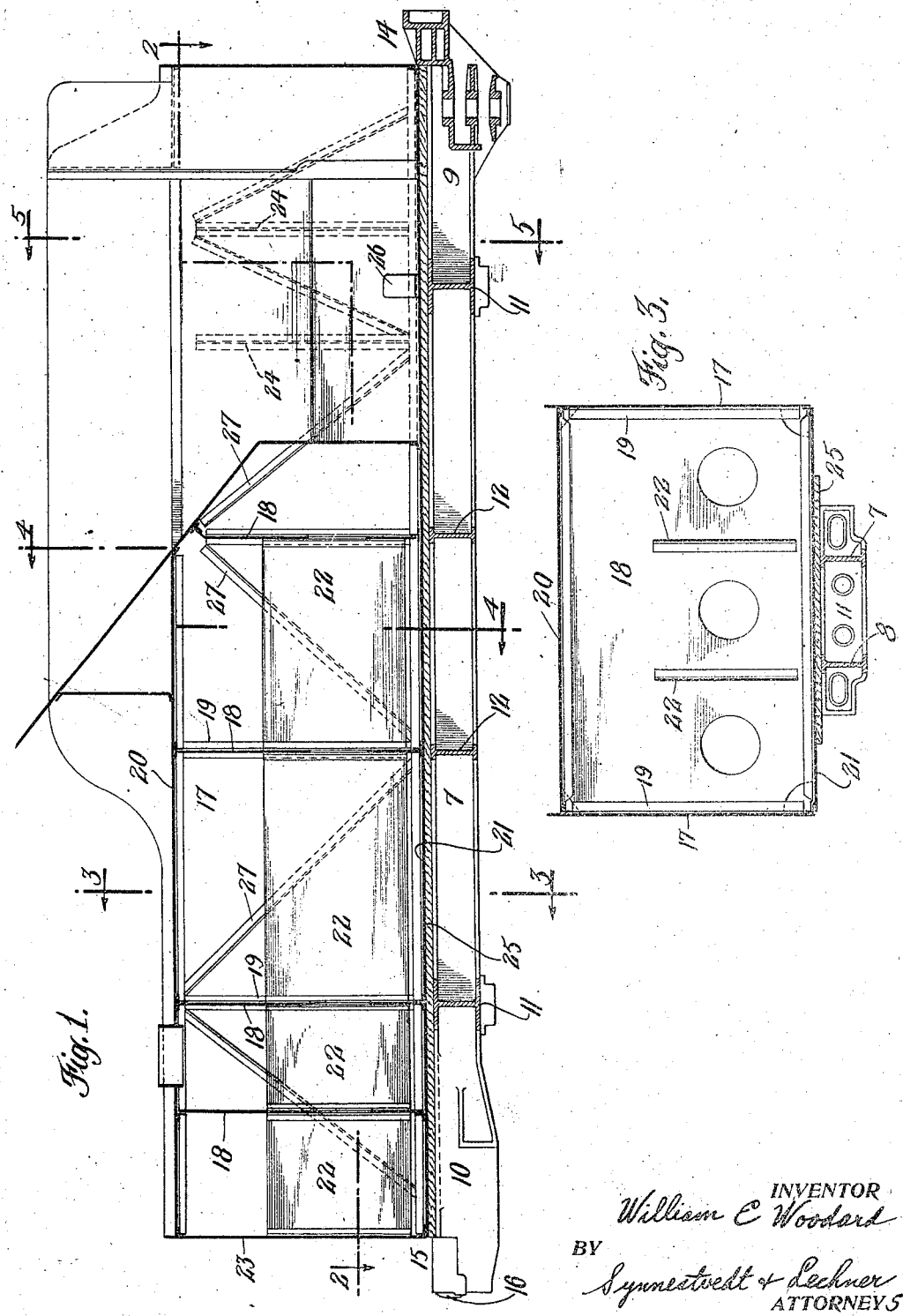
INVENTOR
William E Woodard
BY
Synnestvedt & Lechner
ATTORNEYS Nov. 9, 1926.
W. E. WOODARD
TENDER
Filed Jan. 8, 1925
1,606,284
2 Sheets-Sheet 2
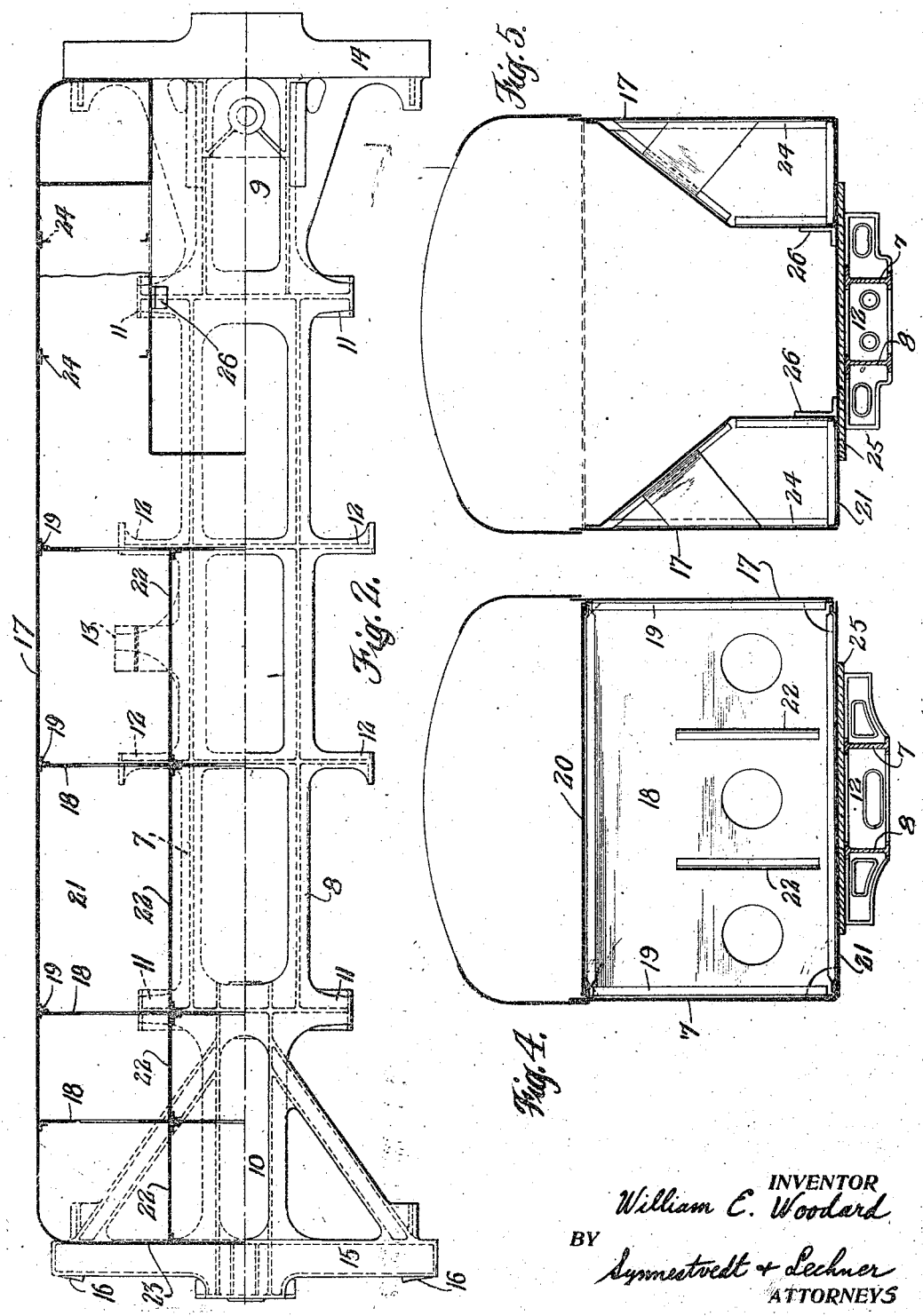
INVENTOR
William E. Woodard
BY
Symnestvedt & Lechner
ATTORNEYS Patented Nov. 9, 1926.

1,606,284

UNITED STATES PATENT OFFICE.

WILLIAM E. WOODARD, OF FOREST HILLS, NEW YORK.

TENDER.

Application filed January 3, 1925. Serial No. 1,135.

This invention relates to tenders for locomotives and it has for its primary object the obtaining of the lightest possible construction consistent with strength.

More specifically, the invention contemplates an improved arrangment and construction of tank and tank and tender frame, whereby the two cooperate to provide a structure characterized by simplicity, lightness and strength.

The foregoing, together with such other objects as may hereinafter appear, or are incident to my invention, are realized by a construction which I have illustrated in preferred form, wherein—

Fig. 1 is a longitudinal section thru a tender tank and its frame made in accordance with my invention;

Fig. 2 is a section taken on the line 2—2 of Fig. 1, and

Figs. 3, 4 and 5 are sections taken respectively on the lines 3—3, 4—4 and 5—5 of Fig. 1.

Referring now to the drawings and particularly to the frame construction, it will be seen that I have provided a frame consisting of two principal longitudinal members, 7 and 8, in which are cast a draw-bar pocket 9 at the front and a suitable recess 10 at the rear for the draft gear. Extending from the longitudinal members are brackets 11 for supporting the side bearings of the trucks under the tender; and brackets 12 for the attachment of the safety chains for the trucks. The brackets 11 and 12 also serve to support the tank. There is a bracket 13, provided on one of the longitudinal members which serves the double function of helping to support the tank and to support the brake cylinder.

At the end of the longitudinal members I provide the bumpers 14 and 15, the forward bumper 14 being constructed for the attachment of tender steps (not shown), and also for the attachment of safety chains for the truck. The rear bumper 15 is constructed to provide push pole brackets 16, and this bumper is also utilized for the attachment of safety chains.

Bumpers are shown of substantially full tender width, altho this may not be necessary. The frame is also shown as being integral and this is the preferred form.

The frame, considered as a whole, is much narrower than the tank and is, therefore, much lighter and more simple than the standard type of frames utilized under tender tanks. The frames ordinarily employed are substantially oblong rectangular in plan view, having side members coming substantially beneath the side plates of the tank.

In association with the narrow frame construction above described, I so construct and arrange the tank that its inherent stiffness may be relied upon to support those portions usually supported by the wider and more heavy frame construction ordinarily employed.

To this end, I provide the side plates 17 of the tank with cross connecting swash plates 18, connected to the side plates by any preferred means as by the commercial sections 19 illustrated. These sections are preferably riveted altho they may be welded to the side plates and the cross braces or swash plates 18 are similarly secured in turn to the sections.

The swash plates are similarly connected to the roof and floor plates 20 and 21 and the latter in turn, are similarly connected to the side plates 17.

Certain of the swash plates 18 are located over the brackets previously described, and longitudinal swash plates 22 connect swash plates 18 and the rear end swash plate 18 with the rear end plate 23 of the tank. It will be seen that the longitudinal swash plates 22 are arranged to constitute in effect continuous longitudinal braces in substantial vertical alignment with the longitudinal members 7 and 8 of the frame. The general configuration of the front end of the tank is as customary in order to provide the coal pocket or bin. Reinforcing commercial sections 24, however, are provided.

The side plates also are provided with the diagonals 27, giving a truss effect.

It will be seen that I have provided a very rigid construction of tank and have so located the respective parts thereof with reference to the central longitudinal frame and its members as to secure maximum strength and rigidity and so as to avail myself of the inherent rigidity of the tank construction, to dispense with the heavier and more complicated standard form of frame.

The tank, considered as a whole, is carried on the boarding 25 secured to the frame, endwise displacement being prevented in the usual manner and sidewise displacement being prevented by such means as the angles 26.

What I claim is:

1. In combination a tender frame of materially less width than the tender tank and provided with brackets for side bearings and safety chain attachment, together with a tank having bracing so disposed with reference to the frame part as to make the overhang of the tank self supporting.

2. In combination a tender frame of substantially less width than the tender tank comprising longitudinal and cross members, together with a tank having combined braces and swash plates extending substantially in vertical alignment with the cross members, and longitudinally extending plates connecting with swash plates.

3. In combination, a tender tank having truss-like bracing for the sides thereof, and a frame of less width than the tank.

4. In combination a tender frame of substantially less width than the tender tank comprising longitudinal and cross members, together with a tank having combined braces and swash plates extending substantially in vertical alignment with the longitudinal members.

5. In combination a tender frame of substantially less width than the tender tank comprising longitudinal and cross members, together with a tank having combined braces and swash plates, some of which extend substantially in vertical alignment with the cross members and others of which extend substantially in vertical alignment with the longitudinal members.

In testimony whereof, I have hereunto signed my name.

WILLIAM E. WOODARD.